March 23, 1937.  G. S. McLAY  2,074,662

ROTATING HEARTH FURNACE

Filed Sept. 25, 1935  2 Sheets-Sheet 1

March 23, 1937.  G. S. McLAY  2,074,662

ROTATING HEARTH FURNACE

Filed Sept. 25, 1935  2 Sheets-Sheet 2

Inventor,
Gavin Suellie McLay
Per: Peck & Peck
Attnys

Patented Mar. 23, 1937

2,074,662

UNITED STATES PATENT OFFICE 2,074,662

ROTATING HEARTH FURNACE

Gavin Smellie McLay, London, England, assignor to Wellman Seaver Rolling Mill Company, Limited, London, England, a company of Great Britain Application September 25, 1935, Serial No. 42,104
In Great Britain October 12, 1934

13 Claims. (Cl. 263—7)

This invention relates to rotatory hearth furnaces and has for one object to provide a simple, accessible and adjustable construction of furnace which is suitable for withstanding relatively high temperattures and which minimizes difficulties of wall and hearth support, drooping of the walls, creeping of the hearth, and sealing, particularly in the case of large furnaces. Other objects will become apparent from the description which follows.

The invention provides a rotary hearth furnace comprising a roof, a side wall supported separately from the roof, a hearth supported separately from the side wall and means for effecting a relative adjustment as to height between the lower edge of the side wall and the adjacent or subjacent edge of the rotary hearth without moving the roof. The invention also provides a rotary hearth furnace comprising means for effecting a relative adjustment as to height between the lower edge of a side wall of the furnace and the adjacent or subjacent edge of the rotary hearth without moving the roof of the furnace and the main body of the hearth. Such relative adjustment may be provided for by making the part carrying the lower edge of the wall vertically adjustable and/or by making the adjacent edge-part of the rotary hearth vertically adjustable.

Thus an outer and/or inner circular wall or walls may be carried on a ring structure which is adjustable as to height upon a supporting structure. Preferably, the outer and/or inner wall or walls is or are built up of brickwork and the ring structure is in two parts of which the upper part is bolted or otherwise secured to a supporting structure, for example stanchions arranged in a circle, and the lower part constitutes the lower support for the brickwork and is secured to the upper part.

The inner face or faces of the side wall or walls may project over the edge or edges of the hearth disposed at substantially the bottom of the said wall or walls. Advantageously, the hearth is built up of concentric rings and consists of rings of refractory material carried upon rings of metal plates. The outer and/or inner rings may be adjustable in height in relation to the main body of the hearth.

One form of rotatory hearth furnace according to the present invention will now be described by way of example and with reference to the accompanying drawings wherein:—

Figure 1:
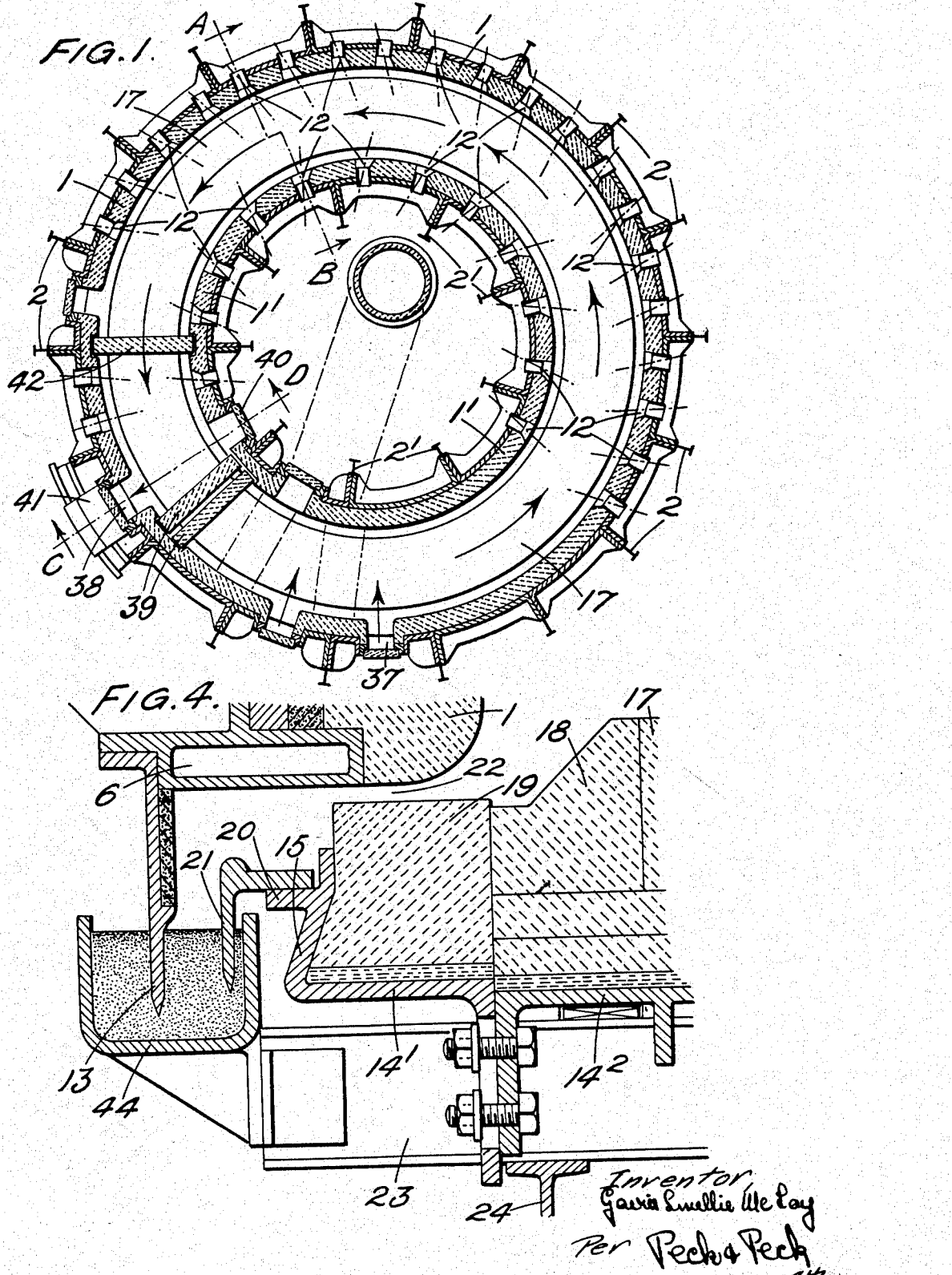
Figure 2:
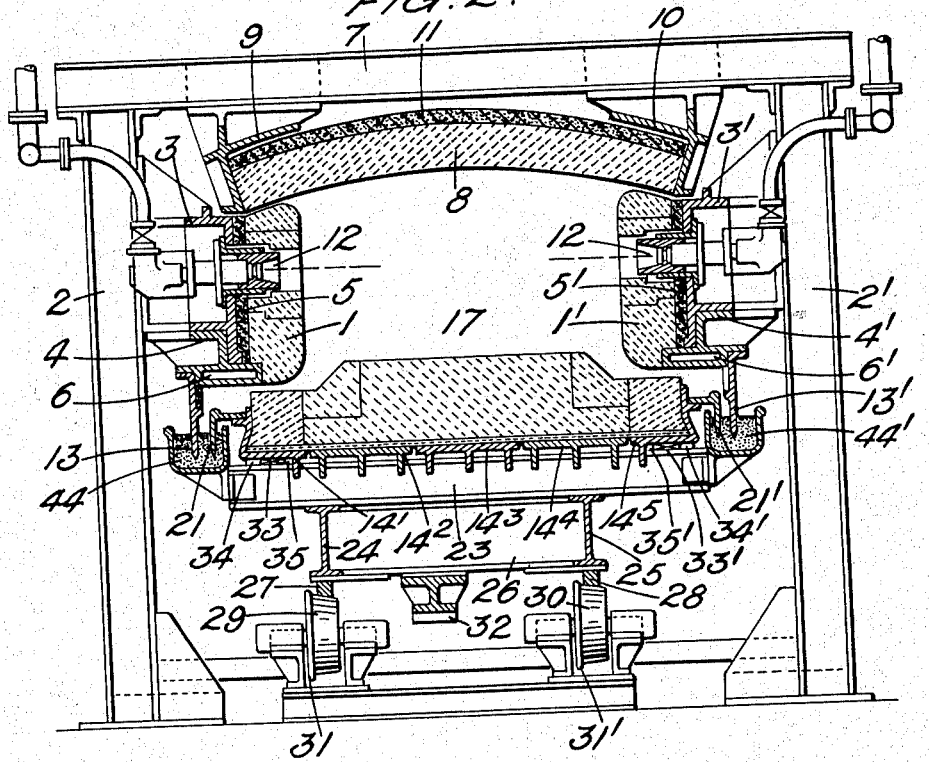
Figure 3:
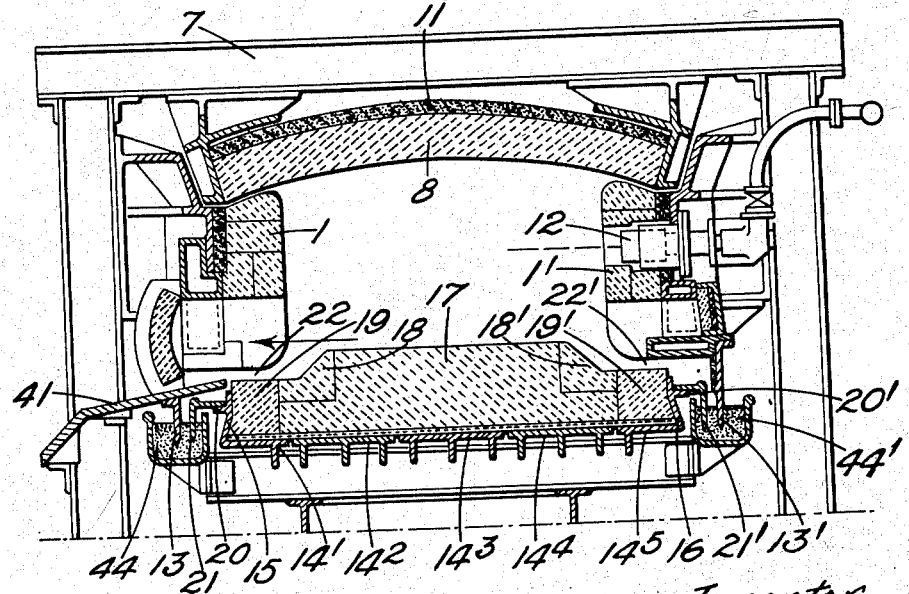

Fig. 1 is a sectional plan,
Fig. 2 is a section on the line A—B of Fig. 1, to a larger scale,
Fig. 3 is a similar section on the line C—D of Fig. 1, and
Fig. 4 is a section showing a modification to a still larger scale.

Referring to Figs. 1, 2 and 3 the outer circular wall of the furnace is built up of brickwork 1 carried by a ring structure bolted or otherwise secured to a number of stanchions 2 arranged in a circle. The ring structure is in two parts, the upper part 3 being bolted to the stanchions 2 and the lower part 4, which constitutes the lower support for the brickwork, is bolted to the upper part 3. A layer of insulation 5 is provided behind the brickwork 1. The lower part 4 of the ring structure is hollow as shown at 6 and serves for the passage for cooling water. The construction of the inner circular wall of the furnace is exactly similar in that the wall is carried by a ring structure bolted or otherwise secured to a number of stanchions arranged in a circle. The stanchions bear the reference 2', the upper part of the ring structure bears the reference 3', the lower part 4', the layer of insulation 5', the passage for cooling water 6', and the brickwork 1'.

Any known and usual method of keying the brickwork 1 and 1' in position may be employed.

The two sets of stanchions 2 and 2' are connected by horizontal radial girders 7 and from these horizontal and radial girders the roof 8 is supported in two cast iron ring brackets 9 and 10 bolted to said girders 8. 11 is a layer of insulation on the top of the roof. The furnace is fired through both the inner and outer walls, 12 being the burners which are preferably directed, as shown, opposite to the motion of the hearth (indicated by arrows in Fig. 1). In some circumstances they might be directed either normal or with the motion of the hearth.

The lower parts 4, 4' of the ring structures of both the outer and inner walls carry depending circular plates 13, 13' respectively which extend into sand seals 44, 44'.

The side walls of the furnace may be arranged to be adjustable in height by passing the securing bolts, for the ring structures through slots in the stanchions 2, 2'. Or other means may be employed for adjusting the height of the side walls.

The two side walls and the roof form a circular tunnel.

The hearth of the furnace is supported on a number of concentric rings $14'$, $14^2$, $14^3$, $14^4$, $14^5$, built up of horizontal plates. The hearth is built up of a central ring portion 17, outer ring portions 18, 19, and inner ring portions $18'$, $19'$ respectively. The sides of the outer plates $14'$, 14⁵, extend upwards along the sides of the hearth as shown at 15, 16 respectively.

The walls 15, 16 carry horizontal flanges 20, 20' to which are bolted rings carrying downwardly depending plates 21, 21' respectively. These plates extend into the sand seals 44, 44'.

The width of the hearth is such that its edges extend under, and preferably to the outsides of the outer and inner circular furnace walls and so that spaces 22, 22' exist between the bottoms of the furnace walls and the surface of the hearth thereunder. It will be understood that the hearth need not extend to the outsides of the furnace walls as is illustrated, but in some cases may extend a little beyond the inner faces of said walls. The plates 14', 14², 14³, 14⁴, and 14⁵ on which the hearth is carried are supported on a structure consisting of a number of radial I-beams 23 carried on two parallel circular I-beams 24, 25 braced together at intervals by radial members 26. The I-beams 24, 25 carry circular rails 27, 28 respectively which are supported on rollers 29, 30. The face of said rollers is inclined inwards towards the centre of the furnace structure as indicated and their outer sides have flanges 31, 31'. A rack 32 is mounted on the underside of the structure from which it is driven by toothed driving gear in known manner. The rack 32 may be driven at one or more points.

Projections 33, 33' are carried on certain of the radial I-beams 23 to be positioned between projections 34, 35 and 34', 35' on the underside of the supporting plates 14', 14⁵ respectively. The projections 33, 33' are of a size to permit a limited degree of freedom of the carrier for the hearth to expand or change its shape under heat conditions. The troughs for the sand seals are bolted to the radial I-beams 23.

A usual charging opening 37 closed by a door and a discharging opening 38 closed by a door are provided. The flue connection may be through the roof or through a side wall and is positioned between the charging and discharging openings. Preferably depending curtain walls 39 are arranged between these two openings to prevent the heating gas passing directly to the flue from burners near to the discharge opening. Other doors may be provided in the outer and inner walls for inspection or other purposes. 40 is such a door in the inner wall opposite the discharge opening. 41 is a plate at the discharge opening to prevent damage should articles be dropped during removal from the furnace. 42 is a further curtain wall to keep the hot gases from the discharge opening.

The furnace is particularly intended for billets but it may be employed for other purposes. During operation it may be rotated continuously or may be stopped as each billet or number of billets is charged to it. Any convenient form of charging gear may be employed. The upwardly extending walls 15, 16 of the hearth prevent the spread of the hearth due to high temperatures.

Any drooping of the side walls which may occur may be taken up by raising the ring structure on the stanchions 2, there being a small space at the top when the furnace is cold.

In the modification of the invention illustrated in Fig. 4 the furnace hearth is built up of a number of concentric rings each supported on a separate circular ring carrier. The carrier 14' for the outer ring 19 is bolted to the adjacent carrier 14² and the carrier for the inner ring (not shown) is similarly bolted to its adjacent carrier. The outer and/or inner ring may thus be adjusted in height so as to compensate for any drooping in the outer and/or inner furnace walls due to the heat conditions.

In the furnace described above the outer and inner sides of the hearth are removed from the heat of the furnace and consequently are maintained cool and they may be easily inspected and are accessible for repairs.

What I claim is:

1. A rotary hearth furnace, comprising a fixedly supported roof, a side-wall supported separately from the roof, a hearth supported separately from the side-wall with an edge adjacent to the lower edge of the said wall, and means for effecting a relative adjustment as to height between the said lower edge of the side-wall and the said adjacent edge of the hearth without bodily adjustment of the roof or hearth.

2. A rotary hearth furnace, comprising a fixedly mounted roof, a rotary hearth of which the main body is vertically inadjustable, a side-wall having its lower edge adjacent to an edge of the said hearth, and means for effecting a relative vertical adjustment between the said lower edge of the wall and the adjacent edge of the hearth.

3. A rotary hearth furnace, comprising a supporting structure, a side-wall and adjustable securing means whereby the said wall can be adjusted as to height and secured to the said structure.

4. A rotary hearth furnace, comprising a circular furnace-wall, a metal ring-structure carrying the said wall, a supporting structure and adjustable securing means whereby the said ring-structure can be adjusted as to height and secured to the supporting structure.

5. A rotary hearth furnace, comprising a brickwork furnace-wall, a supporting structure, a metal ring-structure in two parts, adjustable attachment means whereby the upper part of the said ring-structure is secured to the supporting structure in a vertically adjustable manner, and means for securing the lower part of the said ring-structure to the upper part thereof, the said lower part being arranged to carry the furnace wall.

6. A rotary hearth furnace, comprising a ring-shaped hearth the surface-body of which is built up of several concentric rings of refractory material.

7. A rotary hearth furnace whereof the hearth comprises a series of concentric rings of refractory material and means for adjusting a marginal ring of the said series in height relatively to the rest of the hearth.

8. A rotary hearth furnace, comprising a side-wall and a rotary hearth projecting under the said side-wall and having its surface composed of more than one ring of refractory material, the part of the hearth projecting under the side wall consisting of one such ring.

9. A rotary hearth furnace, whereof the hearth comprises more than one ring of refractory material forming its surface, supporting means for the said material composed of more than one ring of metal plates, and a common supporting structure upon which the said plates are freely carried.

10. A rotary hearth furnace, whereof the hearth comprises more than one ring-shaped section forming its surface, a relatively rigid rotary structure upon which the said sections are freely carried and positive driving elements acting between the said structure and the said sections, the said driving elements being arranged to permit a degree of freedom of movement of the said sections in relation to the said structure.

11. A rotary hearth furnace, comprising a supporting structure, a side-wall vertically adjustable upon the said structure, a rotary hearth, a marginal portion of the said hearth projecting underneath the said wall, and means for adjusting the said marginal portion vertically in relation to the rest of the hearth.

12. A rotary hearth furnace, comprising a furnace-wall and a furnace hearth composed of concentric ring-shaped sections, means for adjusting vertically a marginal section of the hearth, a circular sealing trough carried by said hearth, and depending plates respectively attached to the side wall and marginal section and arranged to dip into said trough.

13. A rotary hearth furnace, comprising a furnace-wall, means for adjusting said wall vertically, a furnace hearth, a circular sealing trough carried by said hearth, and depending plates respectively attached to the bottom of said wall and the adjacent margin of the hearth and arranged to dip into said trough.

GAVIN SMELLIE McLAY.